Aug. 28, 1928.
A. CHEVILLOT
1,682,214
FLUID PRESSURE-BRAKE
Filed March 19, 1927
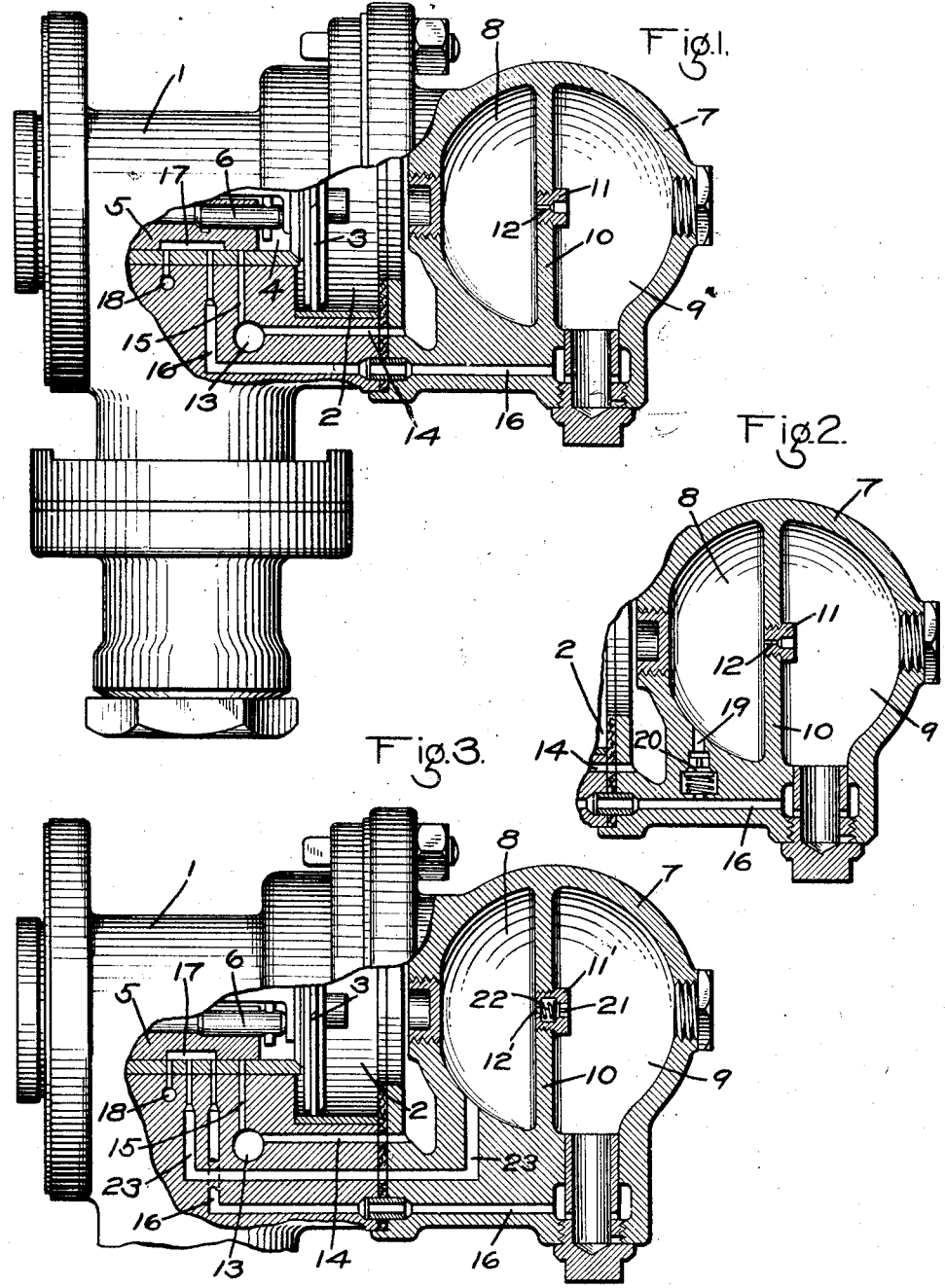
INVENTOR
ALFRED CHEVILLOT
BY Wm. M. Cady
ATTORNEY Patented Aug. 28, 1928.

1,682,214

UNITED STATES PATENT OFFICE.

ALFRED CHEVILLOT, OF PARIS, FRANCE, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 19, 1927, Serial No. 176,686, and in France September 20, 1926.

This invention relates to fluid pressure braking systems of the kind comprising a triple valve or other controlling device dependent for its operation upon variations in the train pipe pressure for controlling the supply of fluid to and its release from the brake cylinders.

In trains of more than 50 cars equipped with certain types of triple valve devices, the following feature has been observed, which occurs on vehicles placed at the end of the train, the travel of the brake pistons of which are in the neighborhood of the maximum value.

With triple valve devices in which fluid under pressure is vented from the brake pipe to a chamber, in order to secure quick serial action in a train in making a service application of the brakes, it is desired to vent fluid from the brake pipe to the chamber through as large a vent as possible in order to hasten the action. If, however, the vent is made as large as desired, there is a tendency for the fluid in the brake pipe to surge back and forth through the brake pipe and thus cause the release movement of some of the triple valves, due to the slight increase in brake pipe pressure coincident with the surge.

The present invention has for its object to obviate the above undesirable action by assuring the permanency of the desired braking on all vehicles of a train wherever they may be placed or whatever may be the length of the brake cylinder piston travel. It also has the effect of considerably reducing the outflow of air through the brake pipe so as to avoid the release of the brakes on the head end of the train by the return surge.

A preferred form of the invention consists in providing means for opposing the establishment of the increase in pressure in the train pipe by means of a volume chamber which, immediately after braking, slowly recharges the brake pipe in a sufficient time.

In the accompanying drawing; Fig. 1 represents a triple valve in partial section and embodying one form of my invention; Fig. 2 a section of a portion of a triple valve device, showing a modified form of my invention; and Fig. 3 a view similar to Fig. 1, and showing a further modification of my invention.

As shown in Fig. 1, the triple valve device may comprise the usual casing 1, having a piston chamber 2 containing piston 3 and a valve chamber 4 containing a main slide valve 5 and a graduating valve 6, adapted to be operated by piston 3.

The triple valve cap 7 is provided with chambers 8 and 9 separated by a partition wall 10 having a plug 11 provided with a restricted passage 12 adapted to connect the two chambers.

Opening 13 is connected to the usual brake pipe, and passage 14 leads from said opening to the piston chamber 2, while passage 15 leads from said opening to the seat of slide valve 5. Chamber 9 is connected to a passage 16, which also leads to the seat of slide valve 5.

In operation, when the brake pipe pressure is reduced to effect an application of the brakes, the reduction in pressure in piston chamber 2 causes the piston 3 to move the slide valve 5 outwardly and in so doing, a cavity 17 in the slide valve connects passage 15 with passage 16, so that fluid is vented from the brake pipe to chamber 9, and thereby a local reduction in brake pipe pressure is produced, to effect the well known quick serial action throughout the train.

From chamber 9, fluid flows at a slow rate through the restricted passage 12 into chamber 8. This slow flow of fluid from the chamber 9 and consequently from the brake pipe after quick serial action has been propagated, serves to prevent any build-up of pressure in the brake pipe by surge of pressure from the head toward the rear of the train, thus stabilizing the brake pipe pressure and preventing possible movement of the triple valve piston to release position.

On the other hand, the chambers 9 and 8 becoming charged with fluid from the brake pipe will permit of a return flow of fluid from said chambers to the brake pipe during the braking operation, in case there is any tendency of the pressure in the brake pipe to fall below a predetermined degree.

When the brakes are released, any fluid remaining in the chambers 8 and 9 is vented to the atmosphere through passage 16, cavity 17 in slide valve 5 and exhaust port 18.

In order to hasten the exhaust of fluid from chamber 8 in releasing the brakes, as shown in Fig. 2, a passage 19 may be provided, to directly connect said chamber with passage 16, a check valve 20 being interposed in said passage, to prevent flow from passage 16 to the chamber 8.

According to the modified construction shown in Fig. 3, the plug 11' in the partition wall 10 is provided with a restricted port 12' and in addition with a check valve 21 acted upon by a spring 22. With this form, the check valve 21 prevents flow from chamber 9 to chamber 8 until the pressure in chamber 9 has been raised to a predetermined degree, when the check valve 21 will open against the pressure of spring 22 and permit the slow flow of fluid from chamber 9 to chamber 8, through the restricted port 12'.

With this construction, fluid in chamber 8 is released when the brakes are released, by way of passage 23 which leads to the seat of slide valve 5 and which is connected in release position, through cavity 17 with the exhaust port 18.

Having now described my invention, what I claim as new and desire to secure by Letters Patent, is:—

1. In a fluid pressure brake, the combination with a brake pipe, of means operating in applying the brakes for venting fluid from the brake pipe to a chamber and thence at a slower rate to a second chamber.

2. In a fluid pressure brake, the combination with a brake pipe, of means operative in applying the brakes for venting fluid from the brake pipe to a chamber and from said chamber at a slower rate to a second chamber.

3. In a fluid pressure brake, the combination with a brake pipe, of means operative in applying the brakes for venting fluid from the brake pipe to a chamber and from said chamber through a restricted port to a second chamber.

4. In a fluid pressure brake, the combination with a brake pipe and a triple valve device operated upon a reduction in brake pipe pressure for effecting an application of the brakes, of means operated upon movement of the triple valve device in applying the brakes for venting fluid from the brake pipe to a chamber and thence through a restricted port to a second chamber.

5. In a fluid pressure brake, the combination with a brake pipe and a triple valve device comprising a piston and slide valve operated upon a reduction in brake pipe pressure for applying the brakes, of a chamber adapted to be connected to the brake pipe through ports controlled by said slide valve in applying the brakes, and a second chamber connected to the first chamber through a restricted port.

6. In a fluid pressure brake, the combination with a brake pipe, of means operated in applying the brakes for venting fluid from the brake pipe to a chamber and thence through a restricted port to a second chamber, and a check valve for preventing back flow from the second chamber to the first chamber.

7. In a fluid pressure brake, the combination with a brake pipe, of means operated in applying the brakes for venting fluid from the brake pipe to a chamber and thence through a restricted port to a second chamber, and a spring pressed check valve for preventing back flow from the second chamber to the first chamber.

8. In a fluid pressure brake, the combination with a brake pipe, of means operated in applying the brakes for venting fluid from the brake pipe to a chamber and thence through a restricted port to a second chamber, and a check valve for preventing back flow from the second chamber to the first chamber, a passage being provided through which fluid is vented from the second chamber in releasing the brakes.

In testimony whereof I have hereunto set my hand.

ALFRED CHEVILLOT